(12) United States Patent
Stark

(10) Patent No.: US 6,640,695 B2
(45) Date of Patent: Nov. 4, 2003

(54) PIZZA INSERT FOR BARBEQUE GRILL

(76) Inventor: Steven Stark, 45 Hollywood Ave., Los Gatos, CA (US) 95032

( * ) Notice: Subject to any disclaimer, the term of this patent is extended or adjusted under 35 U.S.C. 154(b) by 14 days.

(21) Appl. No.: 10/071,810

(22) Filed: Feb. 7, 2002

(65) Prior Publication Data

US 2003/0145740 A1 Aug. 7, 2003

(51) Int. Cl.[7] .................................................. A47J 37/08
(52) U.S. Cl. ........................... 99/447; 99/422; 99/401; 99/343; 99/339; 99/482; 126/273.5; 426/523
(58) Field of Search ...................... 99/422, 447, 401, 99/482, 343, 339, 340; 126/273.5, 275 R; 426/523

(56) References Cited

U.S. PATENT DOCUMENTS

| | | | | |
|---|---|---|---|---|
| 1,685,829 A | * | 10/1928 | Sauvage | 126/275 R |
| 2,099,788 A | * | 11/1937 | Ames | 126/275 R |
| 3,035,568 A | | 5/1962 | Dama et al. | |
| 3,786,741 A | * | 1/1974 | Plumley et al. | 99/447 |
| 3,987,719 A | | 10/1976 | Kian | |
| 4,210,072 A | | 7/1980 | Pedrini | |
| 4,384,513 A | * | 5/1983 | Pierick | 99/447 X |
| 4,498,376 A | | 2/1985 | Carey | |
| 4,640,265 A | * | 2/1987 | Romo | 126/275 R |
| 5,365,833 A | | 11/1994 | Chen | |
| 5,413,033 A | | 5/1995 | Riccio | |
| 5,605,092 A | | 2/1997 | Riccio | |
| 5,678,531 A | * | 10/1997 | Byers et al. | 99/422 X |
| 5,682,873 A | | 11/1997 | Chambers | |
| 5,735,260 A | | 4/1998 | Rimback | |
| 5,873,300 A | | 2/1999 | Kuhlman | |
| 6,041,769 A | | 3/2000 | Llodra, Jr. et al. | |
| 6,187,359 B1 | | 2/2001 | Zuccarini | |

* cited by examiner

Primary Examiner—Reginald L. Alexander
(74) Attorney, Agent, or Firm—Daniel L. Dawes; Myers Dawes Andras & Sherman LLP

(57) ABSTRACT

A pizza insert has at least one tile that rests on a rack that is advantageously spaced above a barbeque grill by a support structure that is connected to the rack and extends downwardly therefrom. The pizza insert also has a rim that extends upwardly from the rack and substantially prevents the tile from moving in horizontal directions. The rim extends away from the rack a distance less than the thickness of the tile so that the rim does not obstruct access to the pizza placed on the tile. Also disclosed are a kit for the pizza insert and the method of using the pizza insert.

24 Claims, 7 Drawing Sheets

PIZZA INSERT FOR BARBEQUE GRILL

BACKGROUND OF THE INVENTION

1. Field of the Invention

The instant invention relates to accessories for enhanced cooking, and with particularly regard to accessories used in an outdoor barbeque grill 25.

2. Description of the Prior Art

Cooking accessories have been devised for use with barbeque grills. One of these is U.S. Pat. No. 3,786,741 issued to Plumley et al. This device is similar to the instant invention in that it is used in conjunction with a barbeque grill. However, Plumley's device has its own lid 61 and is not intended to be covered by a lid of the barbeque grill. Furthermore, Plumley's lid acts as a means for catching drips from the perforated lower surface of the pan of Plumley. Plumley has a perforated surface on which food is placed. This surface lies directly on the rack of the barbeque grill. As such there is no space between the barbeque grill and the surface on which food rests. The exception would be when the lid of Plumley is used as an additional layer between the cooking surface and the grill. In this arrangement juices from the food are caught in the underlying lid as can be seen in FIG. 7. The deep pan and shape and perforated surface on which food is to lie as shown at 40 in FIG. 7, make clear that Plumley's device is not intended for bread type foods. Furthermore, the rim around the cooking surface of Plumley would make it difficult to place pizzas on and to remove pizzas from the pan of Plumley. Plumley also has no tile used in conjunction with her device.

Another reference that has an accessory to be used with a barbeque grill 25 is U.S. Pat. No. 6,187,359 issued to Zuccarini. Zuccarini similarly has a deep pan structure. Zuccarini's device also has vents or holes in the bottom of the pan. This pan lies directly on the grill of the barbeque and is designed to allow hot gases and smoke to penetrate through the vents in the bottom of the pan. While Zuccarini's device is configured to be enclosed by the lid of the barbeque as is the instant invention, Zuccarini's device is configured to have a portion of the device removed from the barbeque grill by means of a handle in order to access the cooked food as shown in FIG. 6. Furthermore, Zuccarini does not have a tile. In fact it appears that a tile would limit Zuccarini's device from working properly.

U.S. Pat. No. 5,365,833 issued to Chen is a device that is arranged to rest on a stovetop. As such it is different from the instant invention. One similarity is that Chen's device incorporates a tile and has the specific purpose of cooking pizzas. However, Chen's device is not intended to be fully enclosed in a barbeque. Furthermore, Chen's device does not have the legs and the other structure that properly directs the heat for a topless insert like the instant invention. Instead Chen's device has its own lid, which helps to guide the hot gases directly from a flame to surround the pizza.

U.S. Pat. No. 4,640,265 issued to Romo has an insert for converting a conventional home oven into a pizza oven. As such, the invention of Romo is limited with regard to its use in a barbeque application. As can be seen in FIG. 1 a downwardly protruding lip on one edge is designed specifically for an indoor oven. Furthermore, the tiles 12 of Romo are not spaced above the rack of the oven as is the instant invention's tile spaced above the grill of a barbeque. While this feature may not be critical in using Romo's device in an indoor oven, it would be critical were the device of Romo to be used in conjunction with an outdoor barbeque. This is so because it has been found with the instant invention that spacing the insert above the grill is important to prevent burning of the bottom of the pizza.

A reference to U.S. Pat. No. 3,035,568 issued to Dama et al. discloses a portable baking device. While column 2, line 44 discloses that this device can be used with an outdoor charcoal fired grill it does not appear that this device would fair well being enclosed in a modern gas grill, or even enclosed in the charcoal grills. Particularly, the thermometer 23 and other features of the device do not appear that they would stand up under the high heat that is encountered in an enclosed barbeque grills. Dama also lacks the tile, the spacing, and the legs, which were lacking in the references discussed above.

It is therefore an object of the instant invention to provide a pizza insert for a barbeque grill that can be enclosed in a gas or other type of outdoor oven or barbeque grill.

It is a primary object of the instant invention to provide this insert such that an upper surface or a cooking surface of the insert is spaced above the grill of an outdoor barbeque.

It is further an object of the instant invention to provide a cooking surface of a tile, which may be ceramic or stone. A related object of the invention is to provide even heat on the cooking surface. Another feature of this invention is to provide a balanced heat that is not conducted directly from the grill to the food but is distributed in the tile.

Another object of the invention is to provide a configuration that inhibits hot gases as they rise from a grill and yet permits the hot gases to escape around the sides of the insert.

It is another object of the invention to provide an insert that has an open top to permit an outdoor barbeque to perform the function of the baking that occurs from above as well as below.

It is a further object of the instant invention to provide a tile stay with at least one opening therein to permit hot gases to contact a lower surface of the tile. The tile stay may be in the form of a flat metal having a plurality of apertures to help distribute heat along a bottom surface of the tile, or it may be in the form of peripheral angle brackets.

BRIEF SUMMARY OF THE INVENTION

The instant invention fulfils the objects set forth above in that it comprises at least one tile that rests on a rack that is spaced above a barbeque grill by a support structure that is connected to the rack and extends downwardly there from. The pizza insert of the instant invention also has a rim that extends upwardly from the rack and substantially prevents the tile from moving in horizontal directions. However the rim extends away from the rack a distance less than the thickness of the tile so that the rim does not obstruct access to the pizza placed on the tile. In one embodiment of the invention a gap is left along one edge of the tile to permit food remnants to be scraped off of the cooking surface. This is achieved by a standoff bracket between the rim and the tile on one edge of the tile.

It is contemplated that the support structure may be in the form of a single panel having a plurality of arched cutouts forming legs between respective arched cutouts. In this embodiment an upper edge of the panel forms the rim around the perimeter of the pizza insert. An intermediate portion of the panel forms a part of the tile stay and supports an angled bracket to provide the remainder of the tile stay. Alternatively, the panel supports an apertured flat metal plate that acts as the tile stay together with a portion of the panel that surrounds the tile. In this embodiment the apertured flat metal plate helps to distribute the heat as it rises from the barbeque and contacts the pizza insert.

Another feature of the invention is that a thermometer may be selectively attached to the pizza insert in a position that provides for easy viewing by a user.

Another aspect of the invention is that there is provided a woodchip tray in conjunction with pizza insert. The woodchip tray may be placed in the barbeque together with the insert. The woodchip tray contains woodchips that are burned to provide a smoke flavor to the pizza.

Another feature of the invention is that a backsplash is provided in addition to or as an extension of the rim along an edge. This edge is intended to be the back edge, and thus the backsplash prevents the pizza from sliding off the back of the insert. This backsplash may extend solely along the back or may extend forward along the sides of the insert.

The instant invention may be embodied as a kit comprising a ventilated tile stay. In this embodiment, the ventilated tile stay includes the horizontal surface for supporting the tile, the rim for inhibiting horizontal movement of the tile, and the support structure that spaces the horizontal surface and tile above the barbeque. The kit further comprises a tile for receipt on the tile stay, a woodchips smoking tray, a thermometer, and a means for removably connecting the thermometer to the tile stay. All other features of the kit are equivalent to those described for the apparatus of the invention elsewhere in the disclosure. However, the kit may additionally include traditional pizza tools, including tools that are known by the name of pizza peals. It should be noted that the instant invention is configured to permit use of traditional pizza peals for placing a pizza on, and removing the pizza from, the tile.

The method of using the pizza insert of the instant invention has its own uniqueness that is related to its unique structural features. This method of using comprises the steps of: placing the pizza insert on a grill; spacing the tile stay and the tile above the grill by positioning the legs or support structure on the grill; heating the insert at a predetermined setting for a first predetermined length of time; placing the pizza in the insert; closing the lid of the barbeque; leaving the pizza in the insert and in the closed barbeque for a second predetermined cook time; and removing the pizza when it has reached a properly cooked state.

By the unique feature of the arched cutouts the instant method includes locating these arches optimally in order to properly inhibit rising hot gas from the barbeque and to properly transfer heat to the tile 16 and permit escaping hot gases through the arches.

Another contributing factor to both the method of using and the product itself is the particular material of the tile. In the preferred embodiment, the tile is a non-glazed high-fired ceramic tile. However, any of a number of other materials may be used including low-fired ceramics, natural stone, synthetic stone, concrete, cement, or a glazed ceramic. While some of these materials in their best known form would not be suitable for the high temperatures and high temperature variations experienced by the instant invention, some special cases exist in the above listed categories. Some materials in the above listed categories have been adapted for use in these extreme environments. Furthermore, it is contemplated that others will be developed, which will lie within the scope and spirit of the tile of the instant invention.

Another aspect of the method is permitted by the relationship of the thickness of the tile with respect to the rim. That is, the height of the tile with respect to the rim permits the use of traditional pizza peals. Peals can be used to place a pizza on the upper surface of the tile and remove a pizza from tile without obstruction by the rim and without scraping the pizza or the peal on the rim.

In an embodiment that provides a gap along one edge of the tile, the method includes scraping remnants of food material off of the cooking surface of the tile and into the gap so that they fall into the barbeque and are burned away. Finally and optionally, the method includes placing a tray of woodchips to be burned within the barbeque in order to provide a smoke flavor to the pizza. This insert may be positioned to one side of or below the insert at the user's discretion.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
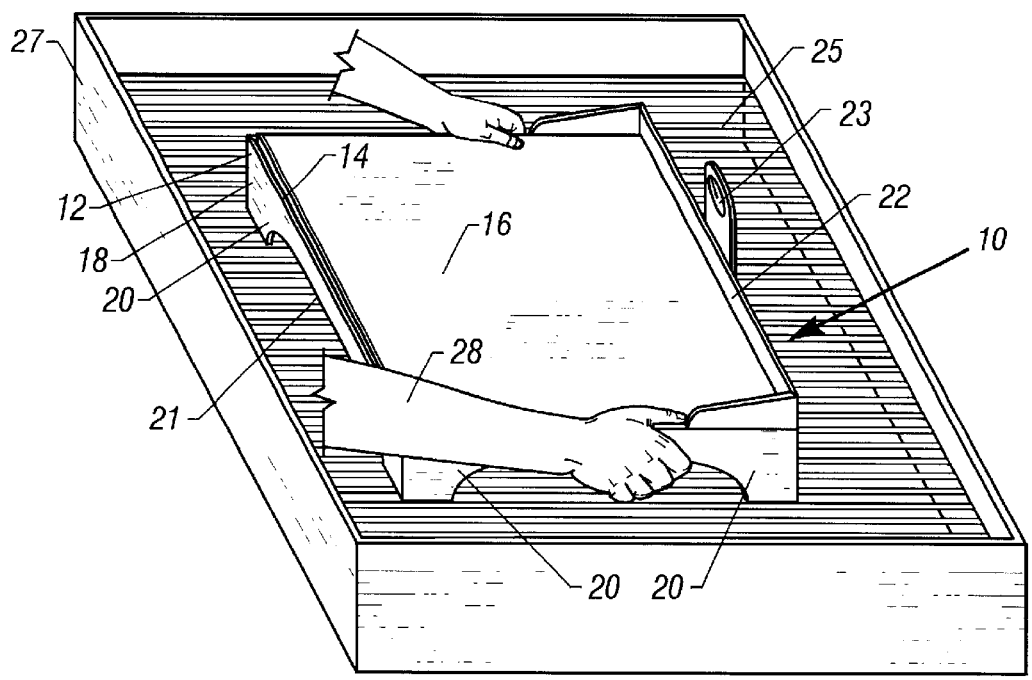
FIG. 1 is a perspective view of the insert being placed on a barbeque grill by a user.

FIG. 1 shows the pizza 64 insert 10 of the instant invention. The pizza 64 insert 10 includes a tile stay 12 which is made up in part by rim 14. The tile stay 12 supports tile 16 on support structure 18. The support structure 18 includes legs 20 separate by arches 21. The arches 21 are in the form of cutouts. Legs 20 are separated by adjacent arches 21.

The rim 14 surrounds the tile 16 on four sides. A backsplash 22 extends upwardly from or as a continuation of rim 14 and extends along at least a backside of the pizza 64 insert 10. A thermometer 23 overlaps and extends upwardly beyond the backsplash 22.

As can be seen in FIG. 1, the pizza 64 insert 10 of the instant invention is normally placed on grill 25 of a barbeque 27 by a user 28. FIG. 1 shows the pizza 64 insert 10 either being placed on the grill 25 or being removed from grill 25.

Figure 1A:
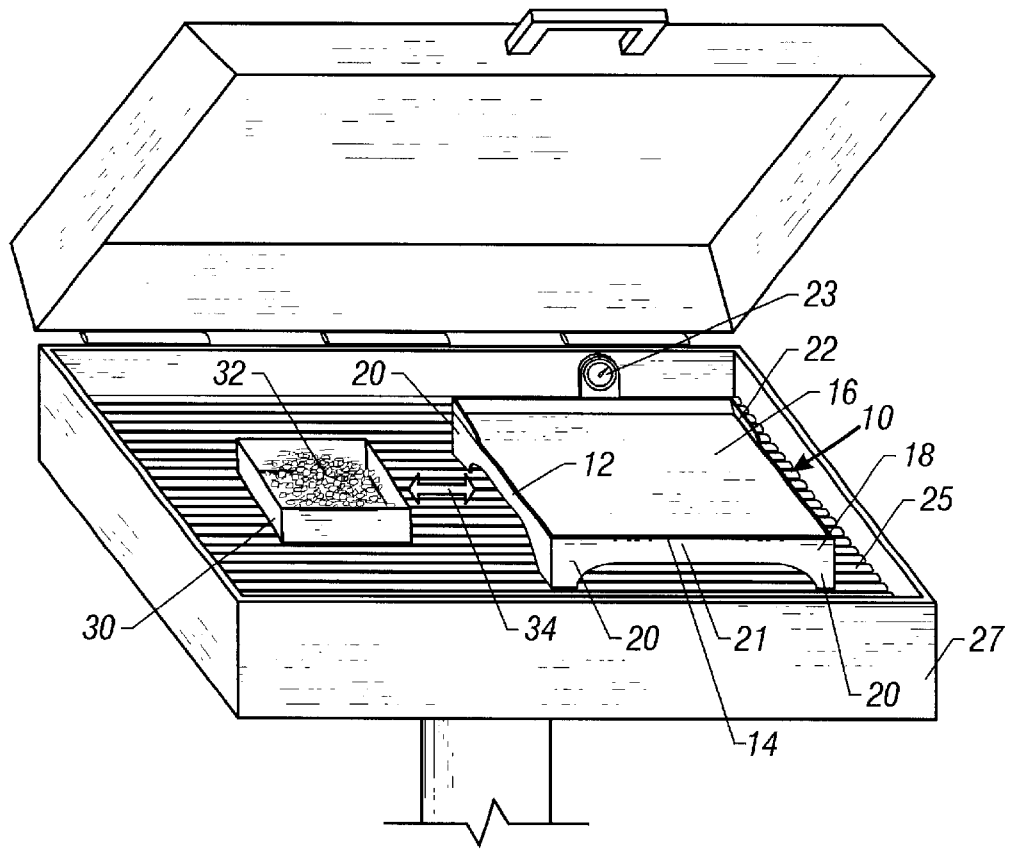
FIG. 1A is a perspective view of the insert of the instant invention in an open barbeque with a woodchip tray.

FIG. 1A shows the pizza 64 insert 10 in combination with the woodchip tray 30, which holds woodchips 32. In use the woodchips 32 are burned to provide smoke flavor to the pizza 64. As indicated by arrow 34 the woodchip tray 30 and woodchips 32 may be located to one side of the pizza 64 insert 10 or may be located below pizza 64 insert 10. FIG. 1A shows the pizza 64 insert 10 and woodchips 32 immediately prior to cook time or immediately following cook time.

Figure 1B:
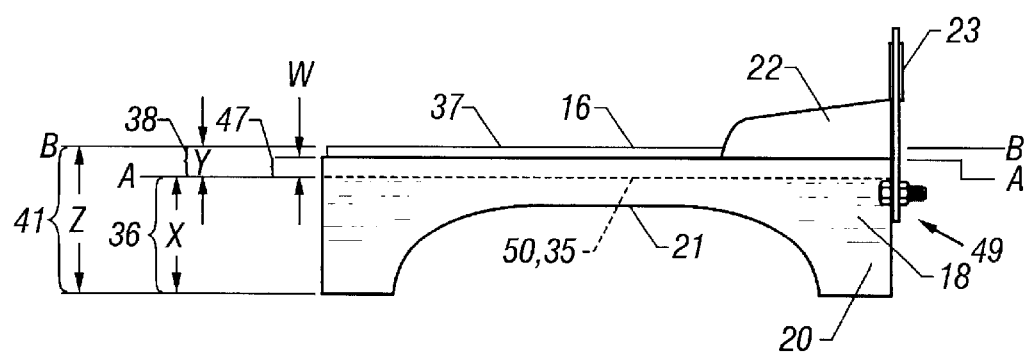
FIG. 1B is a side view of the insert of FIG. 1.

FIG. 1B is a side view of the pizza 64 insert 10. As shown by dashed line 35, an upper surface 35 of the tile stay 12 is provided interiorly of the pizza 64 insert 10. While rim 14 provides a portion of the tile stay 12 and inhibits horizontal movement, the upper surface 35 provides an additional portion of tile stay 12 that supports tile 16 against vertical movement. As can be seen in FIG. 1B, the upper surface 35 supports tile 16 at a specific level above the grill 25. As such, support structure 18 and legs 20 of the support structure 18 provide an x-dimension 36 between the grill 25 and the upper surface 35. A y-dimension 38 is provided between the upper surface 35 of the tile stay 12 and the cooking surface 37 of the tile 16. The x-dimension 36 plus the y-dimension 38 equals a z-dimension 41. The z-dimension 41 is the total distance from the grill 25 to the cooking surface 37 of tile 16.

The upper surface 35 of the tile stay 12 provides a plane A 43. The cooking surface 37 of the tile 16 provides a plane B 45. It has been found that for optimal results the support structure 18 should extend no more than three inches away from the upper surface 35 of the tile stay 12. The tile 16 should be no more than one inch in thickness. Thus, by adding the maximum x-dimension from the grill 25 to plane A 43 and the maximum y-dimension from the upper surface 35 to the cooking surface 37 of the tile 16, we obtain a total of not more than four inches from the grill 25 to the cooking surface 37 of tile 16. However, preferably the upper surface 35 of the tile stay 12 is approximately two and one-half inches away from the grill 25 and the tile 16 has a thickness of approximately one-half inch. Therefore the total preferred distance of the cooking surface 37 from the grill 25 is approximately three inches.

As can further be seen in FIG. 1B the rim 14 extends above plane A 43 by a w-dimension 47. This dimension is less than the thickness of the tile 37. The thermometer 23 may be attached by any conventional fastening means, which is shown in this case as fastening means 49 in the form of a nut and bolt.

Figure 1C:
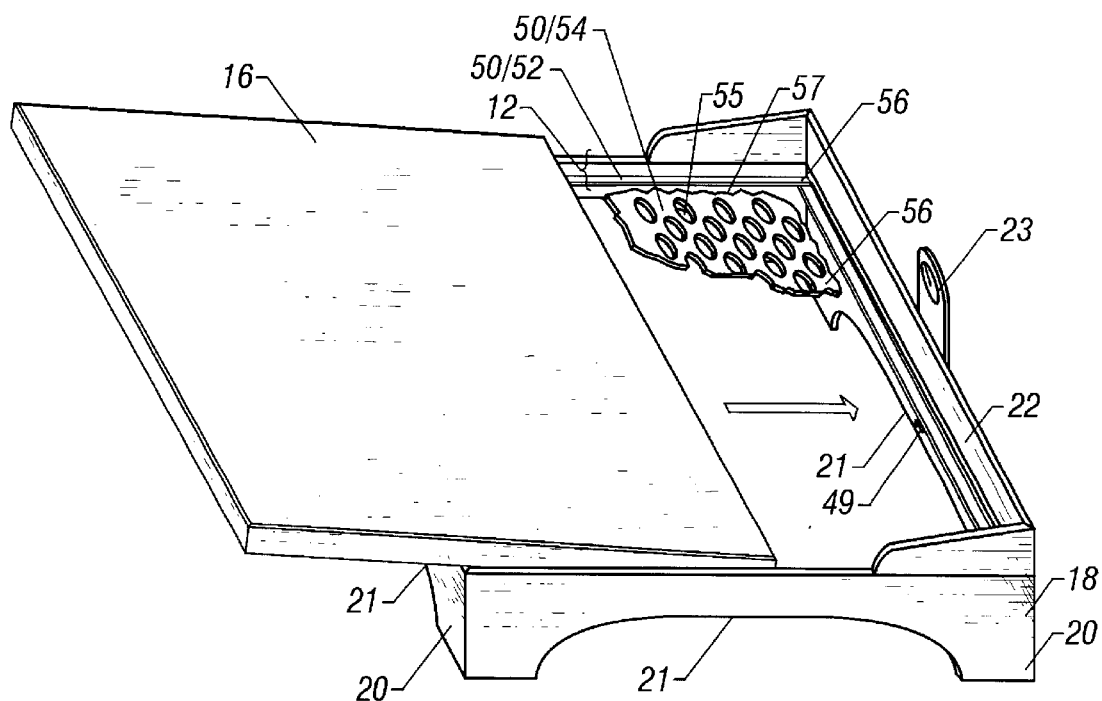
FIG. 1C is a diagrammatic perspective view of the insert of FIG. 1 depicting the placement of the tile on the tile stay.

FIG. 1C shows that the tile stay 12 may comprise a rack 50 in the form of angle bracket 52 or flat apertured metal 54. The non-cutaway portion of flat apertured metal 54 shows apertures 55. Apertures 55 may be provided in the form of well known perforated sheet metal. It is to be understood that in both embodiments of the rack 50 at least one opening 57 is provided. In the embodiment of the rack 50 comprising angle brackets 52, the opening 57 is provided between angle brackets 52 around the inner periphery of the pizza 64 insert 10. In the embodiment comprising flat apertured metal 54, apertures 55 provide a plurality of openings 57.

Figure 2:
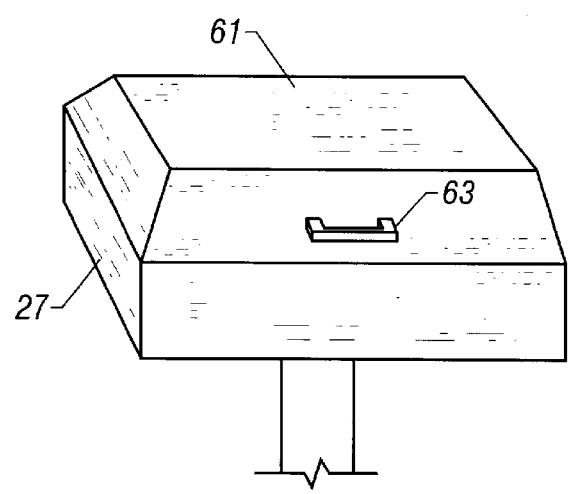
FIG. 2 is a perspective view of a closed barbeque used in conjunction with the instant invention.
Figure 3:
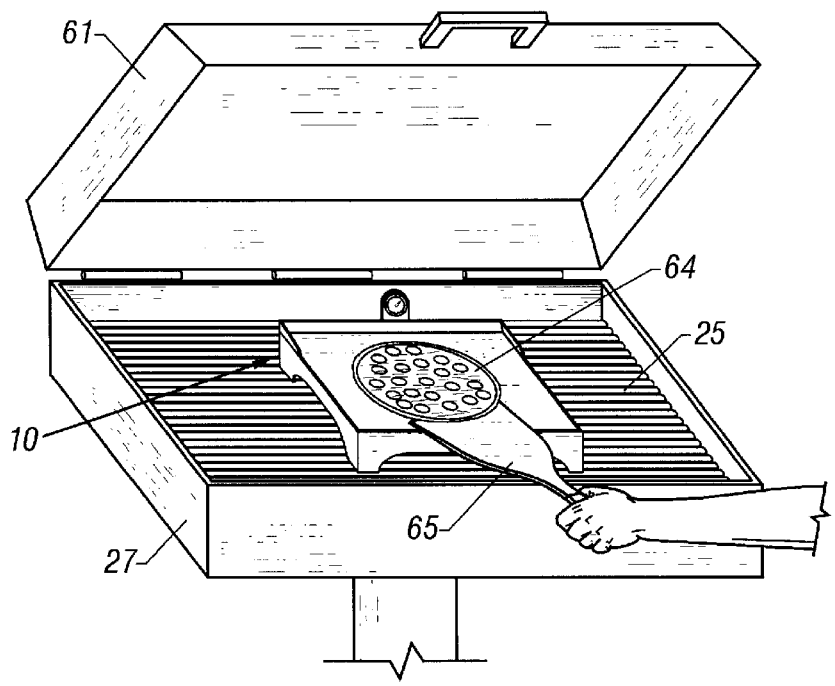
FIG. 3 is a perspective view of an open barbeque with the insert on the grill and in use.

In either case the rack 50 is attached to the support structure 18 of the pizza 64 insert 10 by a conventional method and means. Each embodiment of the rack 50 provides a portion of tile stay 12 to support tile 16 at a specific height above the grill 25. FIG. 2 depicts a barbeque 27 with a lid 61 covering the grill 25. Handle 63 is used to open and close the barbeque 27. FIG. 2 further represents the barbeque before inserting pizza 64 insert 10 or during heating or cooking with the insert inside the barbeque 27. FIG. 3 depicts either placement of pizza 64 on the insert 10 or removal of the pizza 64 from the pizza 64 insert 10. Placement or removal of the pizza 64 may easily be performed using a traditional pizza 64 peal 65.

Figure 4:
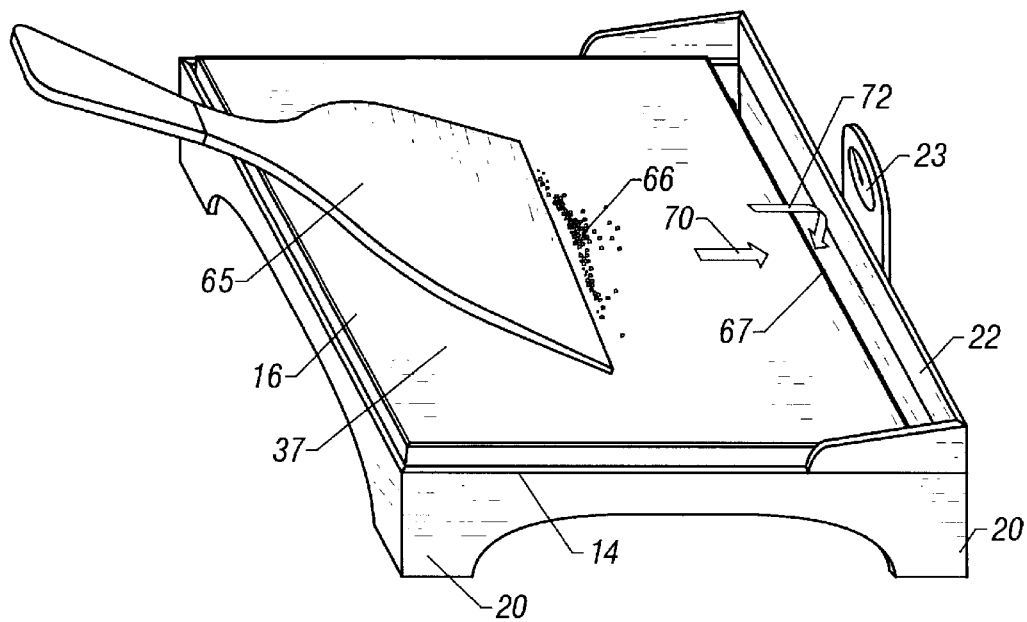
FIG. 4 is a perspective view of an alternative embodiment of the invention.
Figure 4A:
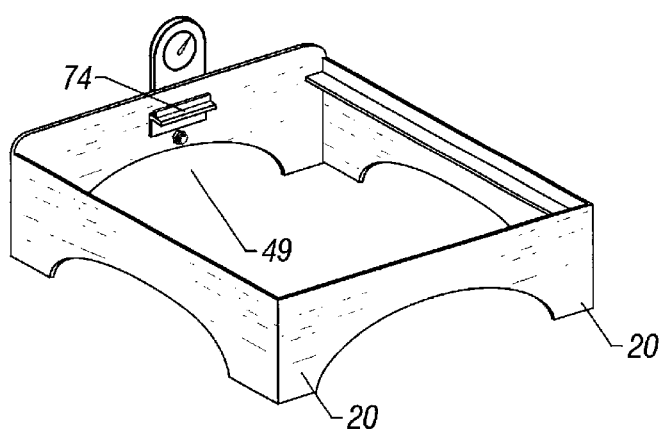
FIG. 4A is a perspective view of the embodiment of the embodiment of FIG. 4 with the tile removed.

As shown in FIG. 4, peal 65 may be used to scrape food remnants 66 from the cooking surface 37 of the tile 16. In this regard, FIG. 4 illustrates an alternative embodiment. In this embodiment the pizza 64 insert 10 is provided with a gap 67 along one edge of the tile 16. As can be seen by arrows 70 and 72, the food remnants 66 are scraped off the edge of tile 16 and into the gap 67 by the peal 65. By way of explanation, the food remnants 66 include but are not limited to cornmeal, which is customarily used to prevent sticking and to provide the proper amount of browning of the dough of the pizza 64. As can be seen in FIG. 4A the gap 67 is provided by a standoff angle bracket 74 on an interior back wall of the insert 10.

Figure 4B:
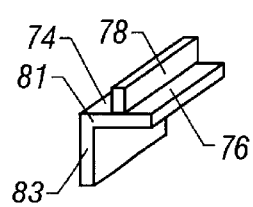
FIG. 4B is a perspective view of the angled standoff bracket of FIG. 4A.

FIG. 4B shows the standoff angle bracket 74 in greater detail. Standoff angle bracket 74 has a horizontal portion 76 and a stop 78 provided by a vertical portion 83 extending upwardly from the horizontal portion 76. A standoff portion 81 extends between the stop 78 and the rim 14 of the pizza 64 insert 10. The standoff angle bracket 74 is supported on the rim 14 of the pizza 64 insert 10 by a vertical portion 83 of the standoff angle bracket 74, which is attached to the rim 14 of the pizza 64 insert 10 by conventional means.

Figure 4C:
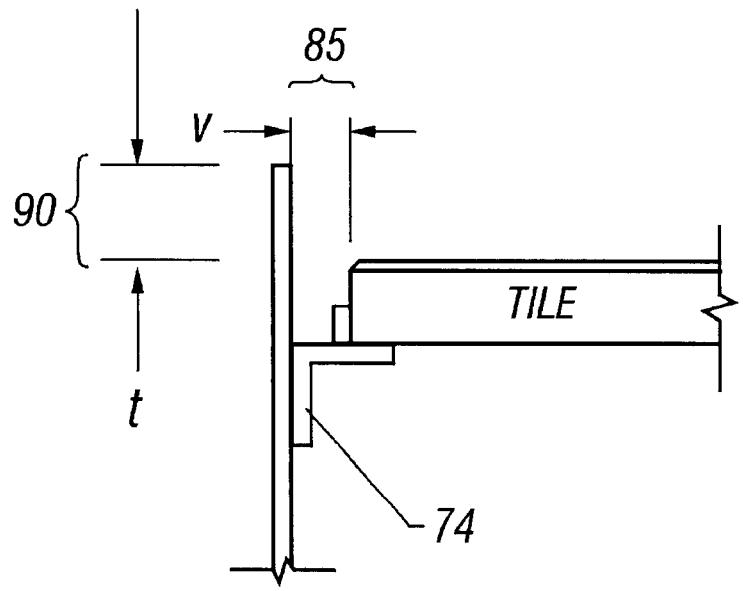
FIG. 4C is an end view of the standoff bracket attached to the support structure of the instant invention.

FIG. 4C depicts the gap 67 that is provided by the standoff angle bracket 74. A u-dimension 85 is provided between the tile 16 and the rim 14 by the stop 78 of angle bracket 52. U-dimension 85 may be of any reasonable width. However, in the preferred embodiment the u-dimension is approximately one-half inch.

Figure 4D:
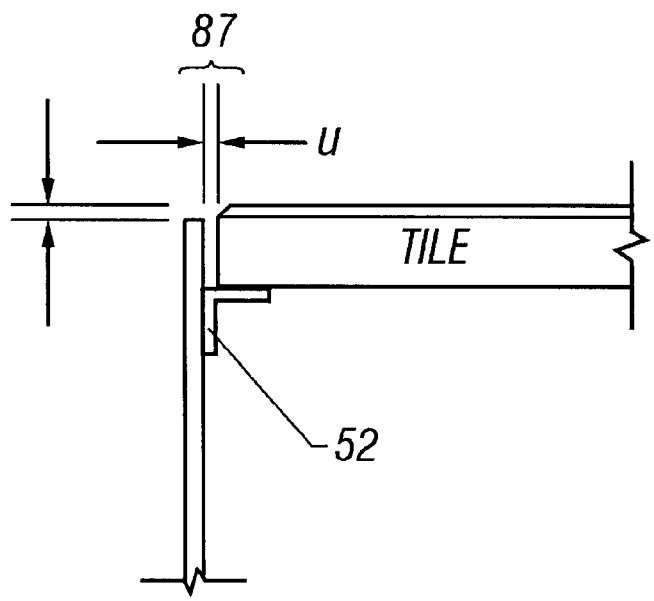
FIG. 4D is an aspect of one embodiment of the tile stay and is an end view of an angled bracket.

As can be seen in FIG. 4D, little or no gap 67 is provided between the tile and the rim 14 on the remaining edges of the pizza 64 insert 10. As illustrated in FIG. 4D a v-dimension 87 is provided between the tile 16 and rim 14. The v-dimension 87 may be of any practical width. However, in the preferred embodiment the v-dimension is approximately one-sixteenth of an inch.

While v-dimension 87 is shown in conjunction with the embodiment having angle brackets 52 it is to be understood that v-dimension 87 is applicable to both the embodiment having angle brackets 52 and to the embodiment having flat apertured metal 54. Furthermore, it is to be understood that while the backsplash may be of any reasonable height in the preferred embodiment the backsplash has a t-dimension 90 of approximately one inch. As shown in FIG. 4c, the backsplash 22 may be an extension of rim 14.

Figure 5:
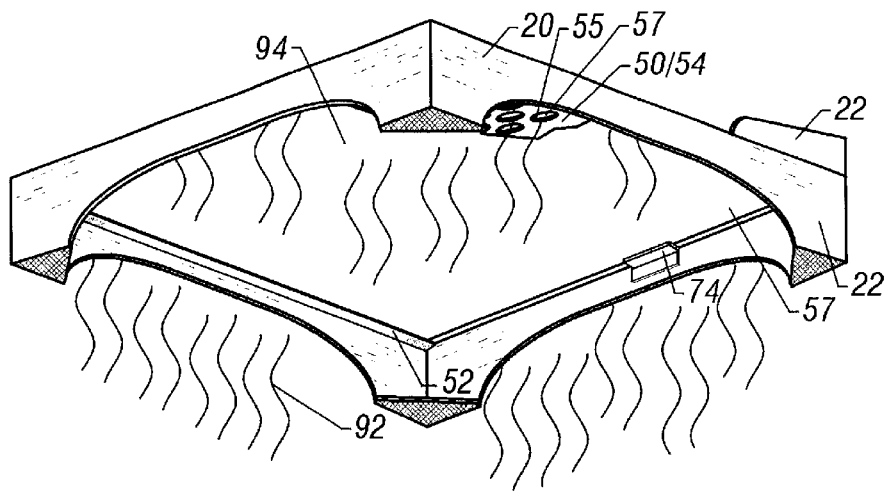
FIG. 5 is a perspective view of the pizza insert from below showing how hot gases engage a lower surface of the pizza insert.

FIG. 5 is a perspective view from the below pizza 64 insert 10. Elements 92 indicate the movement of hot gases 92 as they rise from the grill 25 and contact a lower surface 93 of the tile 16. FIG. 5 also illustrated that in all embodiments there is at least one opening 57 provided through which the hot gases 92 may contact the lower surface 93 of the tile 16.

Figure 5A:
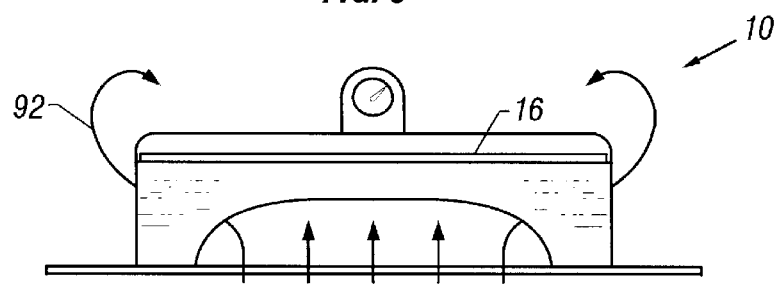
FIG. 5A is a front view of the insert depicting a path of the hot gasses shown in FIG. 5.

FIG. 5A is a front view depicting how the hot gases 92 pass out of the sides through arches 21 and circulate over the top of the insert 10.

Figure 6:
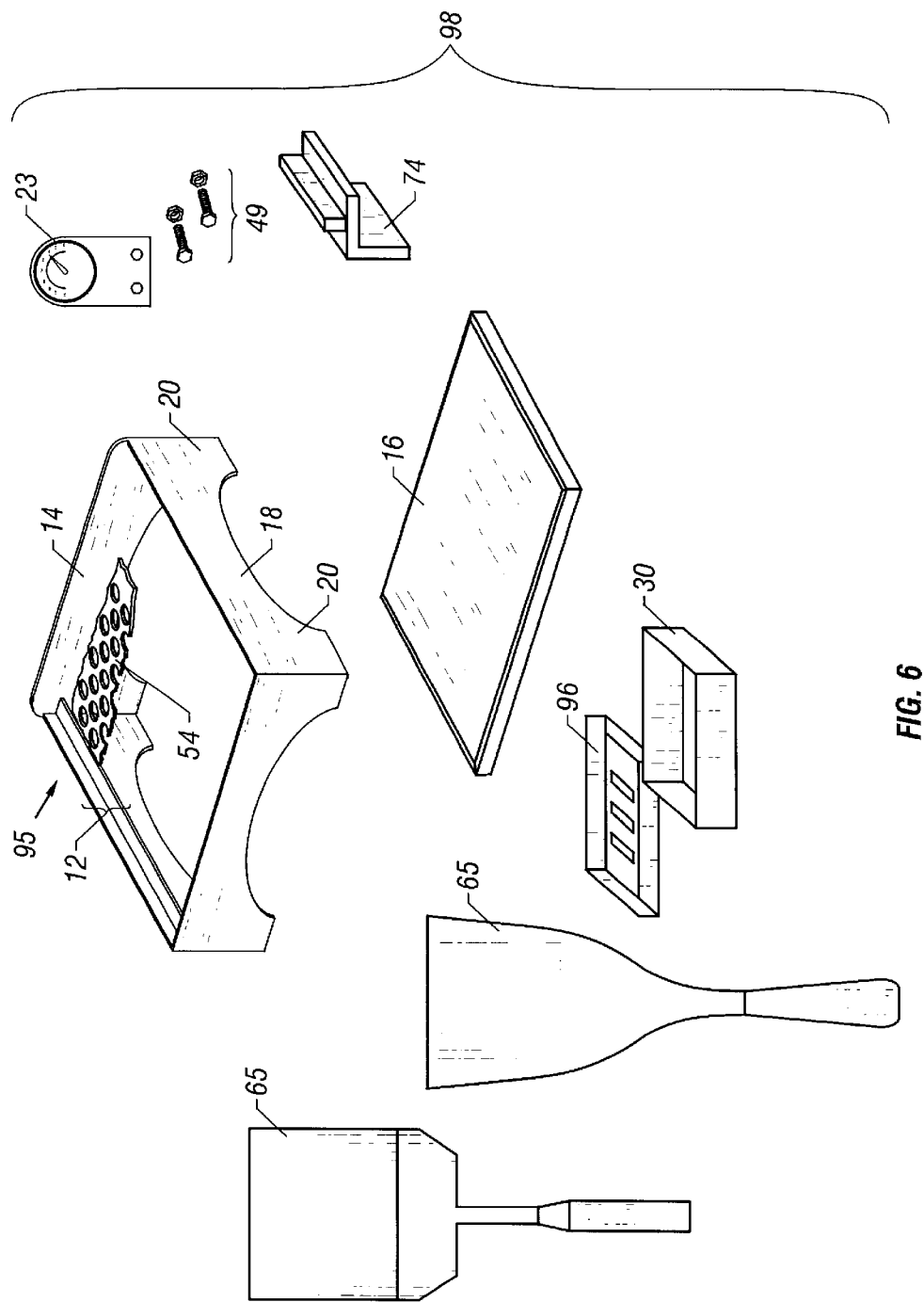
FIG. 6 is a perspective diagrammatic view depicting the elements that comprise a kit of the instant invention.

FIG. 6 is a perspective diagrammatic view illustrating a kit 94 of the pizza 64 insert 10 of the instant invention. The kit 94 is intended to comprise all of the major elements of at least one of the embodiments described above. That is, the kit 94 includes a ventilated tile stay 95. The ventilated tile stay 95 has been described with regard to the embodiments above, but it is here defined as including support structure 18 with its integral legs 20 and a tile stay 12 comprising rim 14 and upper surface 35 of angle brackets 52 or upper surface 35 of flat apertured metal 54. The kit further includes tile 16, peals 65, thermometer 23, fastening means 49, and woodchip box 30. The woodchip box 30 preferably includes a lid 61 for containing the woodchips in the box 30. The kit may further include a backsplash either integral with, or as a separate piece to be selectively attached to, the ventilated tile stay 95.

The instant invention can be advantageously formed of a single panel that comprises the support structure 18. The panel may include arched cutouts defined between downwardly extending legs 20. As such the legs 20 are positioned at corners and the arched cutout extend along sides of the pizza insert 10. When formed in this manner, the rim 14 is an extension of or is an integral portion of the single panel. The upper surface 35 of the tile stay 12 of the instant invention, when formed in this way, is attached to an interior portion of the single panel so that it extends around an inner periphery of the single panel and acts to hold the tile vertically at a set distance above the grill 25 of the barbeque.

Expressed in a different way, the tile stay 12 has an upper surface 35 at a specific height defining a plane A 43. The single panel extends above and below plane A 43 to provide legs 20 extending downwardly from plane A 43 and rim 14 extending above plane A 43. In this way the single panel locates the tile 16 at a specific level above the grill 25.

In use, the pizza insert 10 of the instant invention is placed on grill 25 of a barbeque 27 by user 28. The method of using the pizza insert 10 of the instant invention includes spacing the cooking surface 37 at a specific height above the grill 25. This is achieved by supporting the pizza insert 10 on its legs 20 on the grill 25. After placement of the pizza insert 10 on the grill 25 the step of heating the insert at a predetermined setting will prepare the pizza insert 10 for placement of the pizza 64 thereon. When the pizza insert 10 has reached a proper temperature the user 28 places a pizza 64 on the insert and closes the lid 61 of the barbeque. The pizza 64 is left on the insert and in the barbeque for a second predetermined length of time for cooking. Then the pizza 64 is removed once it has reached its properly cooked state.

The pizza insert 10 in combination with the outdoor barbeque in its closed position simulates a brick oven and provides quality baked pizza 64 similar to those baked in brick ovens.

It should be noted that certain structural characteristics of the instant invention make the method possible. For example, the arched cutouts in the support structure 18 of the pizza insert 10 are optimally configured to properly inhibit rising hot gases 92. As such the hot gases 92 contact a lower surface 93 of the tile 16. A portion of the hot gases 92 are permitted to escape at the highest point of the arches 21. In this way, the arches 21 permit providing a proper balance between the temperature of the tile and the temperature of the interior of the barbeque 27 as part of the method.

Another feature of the instant invention is that since the rim 14 does not reach the same height as the cooking surface 37 of the tile 16, a pizza 64 may be placed on the tile 16 or removed from the tile 16 with traditional pizza 64 tools or peals 65. In this way there is no obstruction to the pizza 64 or the peal as the pizza 64 is placed on or removed from the tile 16. This is a major improvement over any and all of the prior art devices, which are unable to function in this way to receive a pizza 64 or to have a pizza 64 removed using traditional pizza 64 peals 65.

A feature of the alternative embodiment of the invention is that in use a user 28 may scrape food remnants 66 off of the cooking surface 37 of tile 16 and into a gap 67. The usual implementation of this step occurs between the cooking of one pizza 64 and the cooking of another pizza 64. This feature makes convenient the removal of food remnants 66 including cornmeal, which is used during placement of the pizza 64 on the pizza insert 10. If cornmeal is left during several cookings, it eventually burns and effects the quality of the pizza 64.

Another selective step of the instant invention is that of placing a tray of woodchips in the barbeque with the pizza insert 10. The woodchips in the woodchip tray are burned during cooking of the pizza 64 to add a smoke flavor to the pizza 64.

Last but not least it should be noted that the structure of the instant invention permits a step of the method, which is of great importance. This step is the step of enabling hot gases 92 to contact a lower surface 93 of the tile 16 through at least one opening 57 during the steps of heating, closing, and leaving the pizza 64 to cook. This opening 57 is provided by either the space between angle brackets 52 or the plurality of apertures 55 in the flat apertured metal 54 of the embodiments described above.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An insert for a barbeque having a grill and for receiving a pizza on said insert when placed on top of the grill, said insert comprising:
   at least one stone or ceramic tile; and
   a rack having an upper surface generally defining a plane, and having at least one opening in said upper surface, wherein
   said rack supportingly receives said tile;
   a support structure supportingly connected to and extending generally away from said rack to define a predetermined distance and open space between the grill of the barbecue and the tile;
wherein said tile is supported by said rack and said support structure, and wherein said rack and said support structure are adapted to support said tile at the predetermined distance above a grill of said barbeque, which distance and open space is sufficient to more evenly heat the tile and to avoid unintended burning of portions of the pizza and to avoid thermal stress damage to the ceramic or stone tile.

2. The insert of claim 1, wherein:
   said rack is formed of flat metal, and
   said at least one opening is one of a plurality of apertures in said flat metal.

3. The insert of claim 1, wherein:
   the predetermined distance is no more than 3 inches away from said plane, and
   said tile has a thickness that extends no more than 1 inch from said plane on a side opposite said support structure; and
wherein an upper surface of said tile from a grill upon which said insert rests is no more than 4 inches.

4. The insert of claim 3, wherein:
   the predetermined distance is approximately 2½ inches away from said plane, and
   said tile has a thickness that extends approximately ½ inch from said plane on said side opposite said support structure; and
wherein an upper surface of said tile from said grill is approximately 3 inches.

5. An insert for a barbeque for receiving a pizza on said insert in the barbeque, said insert comprising:
   at least one tile;
   a rack having an upper surface generally defining a plane, and having at least one opening in said upper surface, wherein
   said rack supportingly receives said tile;
   a support structure supportingly connected to and extending generally away from said rack; and
   a thermometer selectively and rigidly connected to said rack;
wherein said tile is supported by said rack and said support structure, and wherein said rack and said support structure are adapted to support said tile at a predetermined distance above a grill of said barbeque, said insert further comprising:
   said support structure extending away from said plane in a first direction,
   a rim connected to a periphery of said rack and extending transversely away from said plane in a second direction generally opposite to said first direction.

6. The insert of claim 5, wherein:
   said tile has a predetermined thickness, and
   said rim extends away from said plane a distance less than a thickness of said tile, and
   said rim retains said tile on said rack and substantially prevents movement of said tile in directions parallel to said plane;
whereby a pizza may be slid on or off said tile in a conventional manner without obstruction or scraping from said rim.

7. The insert of claim 6, further comprising a stand off bracket mounted on said rim between said rim and said tile, said stand off bracket forming a portion of said tile stay and a stop to space said tile from said rim along at least one edge of said tile.

8. The insert of claim 5, wherein said support structure is formed of at least one panel, and comprises:
   said at least one panel having a plurality of arched cut-outs;
   said at least one panel defining a plurality of legs with said arched cut-outs disposed between adjacent said legs; and
   said at least one panel further comprising said rim extending transversely from said plane on an opposite side of said plane from said plurality of legs.

9. An insert for a barbeque having a grill and for baking a pizza comprising:
   a frame having an upper surface generally defining a plane generally parallel to the grill,
   a plurality of legs connected to the frame for elevating and supporting the frame above the grill, and
   a ceramic or stone tile supported on the frame at the level of the plane so that an open space is defined between tile and the grill by a distance which is sufficient to reduce uneven heating of the tile and damaging thermal stresses to the tile, the tile and frame being sized so that the frame defines an open slot along one edge of the tile communicating freely with the grill, so that debris on the tile can be scraped from the tile and disposed of into the open slot and into the grill below;
   a back splash connected to the frame and extending above the level of the plane to prevent excess slippage of the pizza on the tile when it is being removed from the tile;
   a thermometer thermally coupled to the frame in a position so that the thermometer provides an indication of the baking temperature achieved at the location of the tile.

10. An insert for a barbeque for receiving a pizza on said insert in the barbeque, said insert comprising:
    at least one tile;

a rack having an upper surface generally defining a plane, and having at least one opening in said upper surface, wherein
said rack supportingly receives said tile;
a support structure supportingly connected to and extending generally away from said rack; and
a thermometer selectively and rigidly connected to said rack;
wherein said tile is supported by said rack and said support structure, and wherein said rack and said support structure are adapted to support said tile at a predetermined distance above a grill of said barbeque, and further comprising
a woodchip tray separate from, yet associated with said insert; wherein said woodchip tray is selectively placed in said barbeque with said insert to burn woodchips in order to add a smoked flavor to a pizza being baked on said insert.

11. An insert for a barbeque having a grill for receiving and baking a pizza on said insert, said insert comprising:
a tile stay having an upper surface generally defining a plane,
a plurality of legs connected to said tile stay for elevatingly supporting said tile stay, wherein said plurality of legs have proximal ends connected to said tile stay and distal ends spaced from the tile stay to space said tile stay from the grill of the barbeque on which said insert is supported by a predetermined distance to define an open space between the grill and the plane, and
at least one ceramic or stone tile supported on said tile stay at the level of the plane so that the open space defined between the plane and the grill is sufficient to reduce the possibility for uneven heating of the tile and damaging thermal stresses to the tile, the tile and tile stay being sized so that the tile stay defines an open slot along one edge of the tile communicating freely with the grill, so that food debris accumulating on an upper surface of the tile can be scraped from the upper surface of the tile and disposed of into the open slot and into the grill below.

12. An insert for a barbeque for receiving and baking a pizza on said insert, said insert comprising:
a tile stay having an upper surface generally defining a plane,
a plurality of legs connected to said tile stay for elevatingly supporting said tile stay, wherein said plurality of legs have proximal ends connected to said tile stay and distal ends spaced from the tile stay to space said tile stay from a surface of the barbeque on which said insert is supported,
at least one tile supported on said tile stay, and
a thermometer selectively and rigidly connected to said tile stay, further comprising a rim around a periphery of said tile stay, said rim extending transversely away from said plane on a side of said plane opposite to said plurality of legs.

13. The insert of claim 12, and further comprising a backsplash, wherein said backsplash is an extension of or an addition to said rim along a portion of said rim, and wherein said backsplash extends generally in the same direction as said rim yet further away from said plane than said rim.

14. The insert of claim 13, and further comprising said thermometer, wherein said thermometer is located on or is an extension of said backsplash, and wherein said thermometer is removably connected to said insert.

15. The insert of claim 13, wherein said thermometer is cantilevered on said rim or said backsplash in a generally transverse direction relative to said plane.

16. A pizza oven insert kit for barbeque grills for converting a barbeque grill into a pizza oven for baking a pizza, said kit comprising:
a ventilated tile stay;
at least one tile for receipt on said tile stay;
a wood chip smoking tray; and
a thermometer and means for removably and rigidly connecting said thermometer to said tile stay.

17. The pizza oven insert kit of claim 16, wherein:
said ventilated tile stay further comprises metal having a plurality of apertures therein;
a plurality of legs connected to a periphery of said tile stay and extending in a first direction away from said tile stay for spacing said tile stay from a barbeque grill surface; and
a rim connected to said tile stay around said periphery of said tile stay and extending away from said tile stay in a second direction opposite to said first direction.

18. The pizza oven insert kit of claim 17, wherein:
a backsplash is provided as an extension of or an addition to said rim along a portion of said rim, and wherein said backsplash is adapted to extend generally in said second direction; and
said means for removably and rigidly connecting said thermometer further comprises means on said insert for receiving a connection with said thermometer.

19. The pizza oven insert kit of claim 17, wherein said rim extends away from said tile stay a distance less than a thickness of said tile, and said kit further comprises at least one pizza peel for placing a pizza on or removing a pizza from said tile.

20. A method of using a pizza insert for an outdoor barbeque for obtaining a high quality baked pizza similar to that achieved in a brick oven, the insert comprising:
a tile stay,
at least one tile supportingly received on said tile stay, and
legs supportingly connected to said tile stay for spacing said tile stay above a cooking surface of said grill;
said method comprising the steps of:
placing said pizza insert on said grill and spacing said tile stay from said cooking surface of said grill by resting said legs on said cooking surface of said grill;
heating said insert at a predetermined setting for a first predetermined length of time;
placing a pizza in said insert;
closing a lid of said outdoor barbeque;
leaving the pizza in said insert inside the closed said barbeque for a second predetermined cook time; and
removing the pizza when it has reached a properly cooked state.

21. The method of using of claim 20, wherein:
said insert comprises at least one panel forming said legs, said at least one panel having arcs defining said legs between adjacent said arcs, said arcs configured in a predetermined manner to properly guide and inhibit rising hot gases;
said steps of placing said insert and spacing said tile stay further comprise:
locating said arcs optimally to properly guide and inhibit rising hot gases to provide a proper balance between a temperature of said tile and a temperature of an interior of said barbeque;
said step of placing said pizza further comprises placing said pizza on said at least one tile with a conventional pizza utensil;

a rim is connected to said tile stay and extends upwardly therefrom to inhibit horizontal movement of said at least one tile, wherein said rim extends upwardly less than a thickness of said tile; and said step of removing said pizza further comprises removing said pizza from said at least one tile with a conventional pizza utensil without obstruction or scraping from said rim.

22. The method of claim 21 wherein said insert further comprises at least one stand off bracket connected to said rim between said rim and said tile, said stand off bracket providing a portion of said stay and a stop, said stop spacing said tile from said rim and forming a gap along an edge of said tile between said tile and said rim; said method further comprising the step of scraping food remnants left on said tile off said edge of said tile and into said gap so that said food remnants fall into said grill.

23. The method of claim 20, further comprising the step of placing a tray of wood chips to be burned within said barbeque in order to add a smoked flavor to said pizza.

24. The method of claim 20 wherein said tile stay has at least one opening therein, said method further comprising the step of enabling hot gases to contact a lower surface of said at least one tile via said opening during said steps of heating, and closing, and leaving.

* * * * *